US011609953B2

(12) United States Patent
    Tyagi

(10) Patent No.: US 11,609,953 B2
(45) Date of Patent: Mar. 21, 2023

(54) TIMELINE CONTROL WITH IN-PLACE DRILL-DOWN ACCESS TO EVENTS

(71) Applicant: SAP SE, Walldorf (DE)

(72) Inventor: Harish Tyagi, Saratoga, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/322,491

(22) Filed: May 17, 2021

(65) Prior Publication Data
    US 2022/0365980 A1     Nov. 17, 2022

(51) Int. Cl.
    | | |
    |---|---|
    | *G06F 16/00* | (2019.01) |
    | *G06F 16/903* | (2019.01) |
    | *G06F 16/9032* | (2019.01) |
    | *G06F 9/54* | (2006.01) |
    | *G06F 16/9035* | (2019.01) |
    | *G06F 16/9038* | (2019.01) |
    | *G06F 16/332* | (2019.01) |

(52) U.S. Cl.
    CPC ........ *G06F 16/90348* (2019.01); *G06F 9/542* (2013.01); *G06F 16/3323* (2019.01); *G06F 16/9035* (2019.01); *G06F 16/9038* (2019.01); *G06F 16/90328* (2019.01)

(58) Field of Classification Search
    CPC .................................................. G06F 16/3323
    See application file for complete search history.

(56) References Cited

U.S. PATENT DOCUMENTS

2011/0103572 A1*  5/2011  Blair ...................... G06Q 10/00
                                                                 379/265.06

* cited by examiner

*Primary Examiner* — Ajith Jacob
(74) *Attorney, Agent, or Firm* — Buckley, Maschoff & Talwalkar LLC

(57) ABSTRACT

Systems and methods providing drill-down access to timeline events to a user by a user interface are disclosed herein. In some embodiments, a timeline is presented to a user by the user interface. The timeline may comprise a plurality of event cards comprising event data associated with a customer. The user may select an input associated with the event card. Upon selection of the input, a second plurality of event cards indicative of an event category and associate with the customer may be displayed.

20 Claims, 6 Drawing Sheets

TIMELINE OBJECT

INTERACTIONS ∨ OBJECTS ∨ LAST 7 DAYS ∨

FRIDAY | FEB 24, 2020

EMAIL RECEIVED FROM MIKE ROSS: RE: ISSUE WITH THE PRODUCT 3  ⊘ 4:30PM

FROM: MIKEROSS@MAIL.COM
TO: KIXO@SUPPORT.COM
SUBJECT: RE: ISSUE WITH THE PRODUCT

📎 SCREENSHOT_IMG8219 ∨

HELLO,
I OWN 5 SMART HOME DEVICES SYNCED WITH SMART HUB WITH REGISTERED PRODUCT ID OF 3219171. SO, I WAS TRYING TO RESET MY SMART HOME APPLAINCES ALL TOGETHER AND I GOT AN ERROR. PLEASE CHECK THE ATTACHED SCREENSHOT. CAN YOU PLEASE HELP ME OUT IN THIS REGARD?

SED UT PERSPICIATIS UNDE OMNIS ISTE NATUS ERROR SIT VOLUPTATEM ACCUSANTIUM DOLOREMQUE LAUDANTIUM, TOTAM REM APERIAM, EAQUE IPSA QUAE AB ILLO INVENTORE VERITATIS ET QUASI ARCHITECTO BEATAE VITAE DICTA SUNT EXPLICABO. NEMO ENIM IPSAM VOLUPTATEM QUIA VOLUPTAS SIT ASPERNATUR AUT ODIT AUT FUGIT, SED QUIA CONSEQUUNTUR MAGNI DOLORES EOS QUI RATIONE VOLUPTATEM SEQUI NESCIUNT. NEQUE PORRO QUISQUAM EST, QUI DOLOREM IPSUM QUIA DOLOR SIT AMET, CONSECTETUR ADIPISCI VELIT, SED QUIA NON NUMQUAM EIUS MODI TEMPORA INCIDUNT UT LABORE ET DOLORE MAGNAM ALIQUAM QUAERAT VOLUPTATEM. UT ENIM AD MINIMA VENIAM, QUIS NOSTRUM EXERCITATIONEM ULLAM CORPORIS SUSCIPIT LABORIOSAM, NISI UT ALIQUID EX EA COMMODI CONSEQUATUR? QUIS AUTEM VEL EUM IURE REPREHENDERIT QUI IN EA VOLUPTATE VELIT ESSE QUAM NIHIL MOLESTIAE CONSEQUATUR, VEL ILLUM QUI DOLOREM EUM FUGIAT QUO VOLUPTAS NULLA PARIATUR...

SEE MORE

EMAIL SENT TO MIKE ROSS: RE ISSUE WITH THE PRODUCT  FEB 23, 2020 | 11:55 AM

EMAIL RECEIVED FROM MIKE ROSS: RE: ISSUE WITH THE PRODUCT  FEB 21, 2020 | 11:55 AM

INCOMMING CALL FROM MIKE ROSS: AIR CONDITIONER FAN BROKEN, PARTS NOT COVERED UNDER CONTRACT...(00:01:02)  4:30 PM

FIG. 3

TIMELINE CONTROL WITH IN-PLACE DRILL-DOWN ACCESS TO EVENTS

BACKGROUND

1. Field

Embodiments of the present teachings relate to timeline control. More specifically, embodiments relate to in-place drill-down timeline control for in-service access of timeline events.

2. Related Art

A typical timeline displays a history of events according to the timeline of the events. A customer may contact an agent, or a user, about an order and the history of events related to the order and the customer may be displayed to the agent. The agent may represent a business entity from which the customer has purchased a product or service. The timeline may display the history of events comprising various interactions with the customer such as, for example, orders placed, telephone calls, website click-throughs, direct messages, chat interactions, as well as any other interactions and profile information of the customer.

The timeline typically displays all events relative to a chronological order of the events. As the customer typically communicates based on the most recent events, the most recent events may be displayed at the top of the timeline then the subsequent events displayed in chronological order below. The user may view particular events by selecting the events on the timeline or selecting an interaction button associated with each event. Upon selection of an event, the information indicative of the event may be displayed directly on the timeline or a new window may appear displaying the information indicative of the event. As the communication and various interactions with the customer occur, the timeline for the customer, displayed to the user, continues to grow. The longer the timeline is the more difficult and confusing it becomes to find specific events. The customer may be a long-time customer with many events. Furthermore, the complications are exacerbated in an interaction where the customer is a business entity and events may occur on a daily basis.

What is needed are systems and methods for providing a customizable timeline that may be configured to provide the user with a drill-down display of event categories such that the user does not filter through the entire timeline to find a particular event. The timeline may filter unwanted events through categorization such that the user can quickly and easily find a particular historical event, in some embodiment, with a single click.

SUMMARY

Embodiments described herein provide benefits of reducing data displayed to a user by providing drill-down timeline control that allows users of the timeline to filter events associated with a particular customer or product by simply selecting an event on the timeline and displaying customized event categories. In some embodiments, a single click by the user may reduce the events by event category providing only events that the user wishes to be displayed. As such, the user may quickly and efficiently filter out unnecessary data to reduce the displayed data to a manageable amount. Furthermore, the user may continue to utilize the single-click method to further reduce the displayed data to other event categories and sub-categories.

Embodiments are directed to methods of providing drill-down access to event categories on a user interface, the method comprising the steps of causing, by the user interface, display of a timeline to a user, wherein the timeline comprises a first plurality of event cards associated with a customer, wherein the first plurality of event cards is indicative of a plurality of events and a plurality of event categories associated with the customer, receiving, by the user interface and from the user, a selection of an event category by an event card of the first plurality of event cards, and causing display of a second plurality of event cards, wherein the second plurality of event cards is indicative of the customer and the event category.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein:

FIG. 3 depicts an exemplary a timeline comprising event cards for embodiments of the present teachings;

Figure 5:
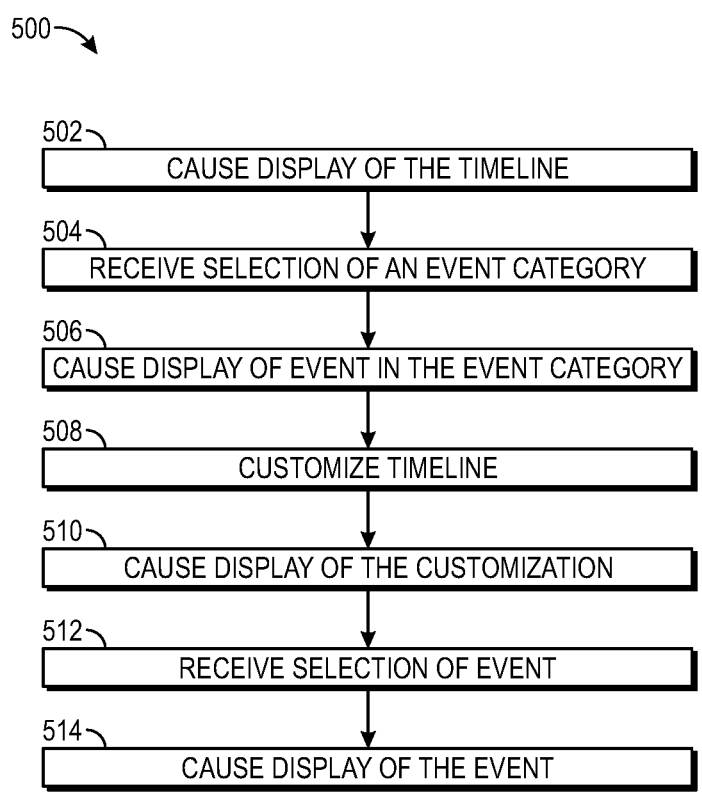
Figure 6:
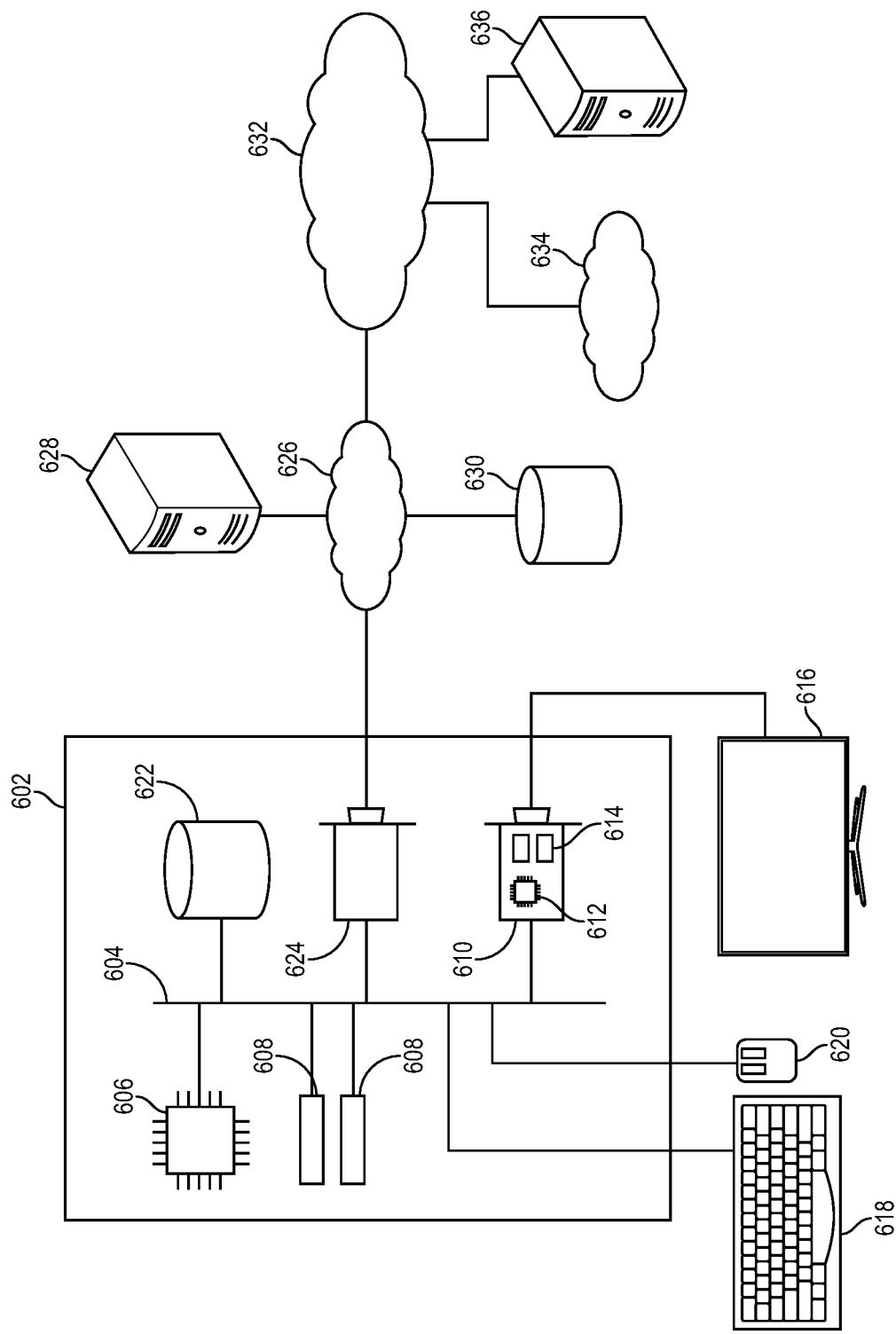

FIG. 5. depicts an exemplary method for causing display of events on a timeline for embodiments of the present teachings; and FIG. 6 depicts an exemplary hardware platform for embodiments of the present teachings.

The drawing figures do not limit the claimed scope to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the invention(s) herein described. Other embodiments can be utilized, and changes can be made without departing from the claimed scope. The following detailed description is, therefore, not to be taken in a limiting sense. The scope of the claimed invention(s) is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, embodiments of the invention can include a variety of combinations and/or integrations of the embodiments described herein.

Generally, embodiments may be directed to systems, computerized methods, or computer programs for providing a user interface comprising a timeline. The timeline may comprise events associated with a customer and a product or service. The events may be from any event category such as, for example, product and service orders, communications, profile creation, and any other event category that may be associated with at least one of the customer and the product or service. The user of the timeline may select a card displayed on the timeline. The card may be indicative of an event and an event category. When the card is selected, in some embodiments, the event information indicative of the event may be displayed. In some embodiments, event categories may be filtered such that only the event category associated with the card may be displayed. For example, if the card is indicative of a phone call with the customer, when the user selects the card, a chronological list of a history of phone calls with the customer may be displayed. In some embodiments, the events, event categories, and timing may be customized by the user.

In some embodiments, the methods and systems provide a user interface that filters data to provide drill-down access to events associated with a customer to provide more efficient assistance to the customer. Rather than displaying all historical events associated with the customer, a single click by the user may reduce the events by event category providing only events that the user wishes to be displayed. As such, the user may quickly and efficiently filter out unnecessary data to reduce the displayed data to a manageable amount. Furthermore, the user may continue to use the single-click method to further reduce the displayed data to other event categories and sub-categories.

Figure 1:
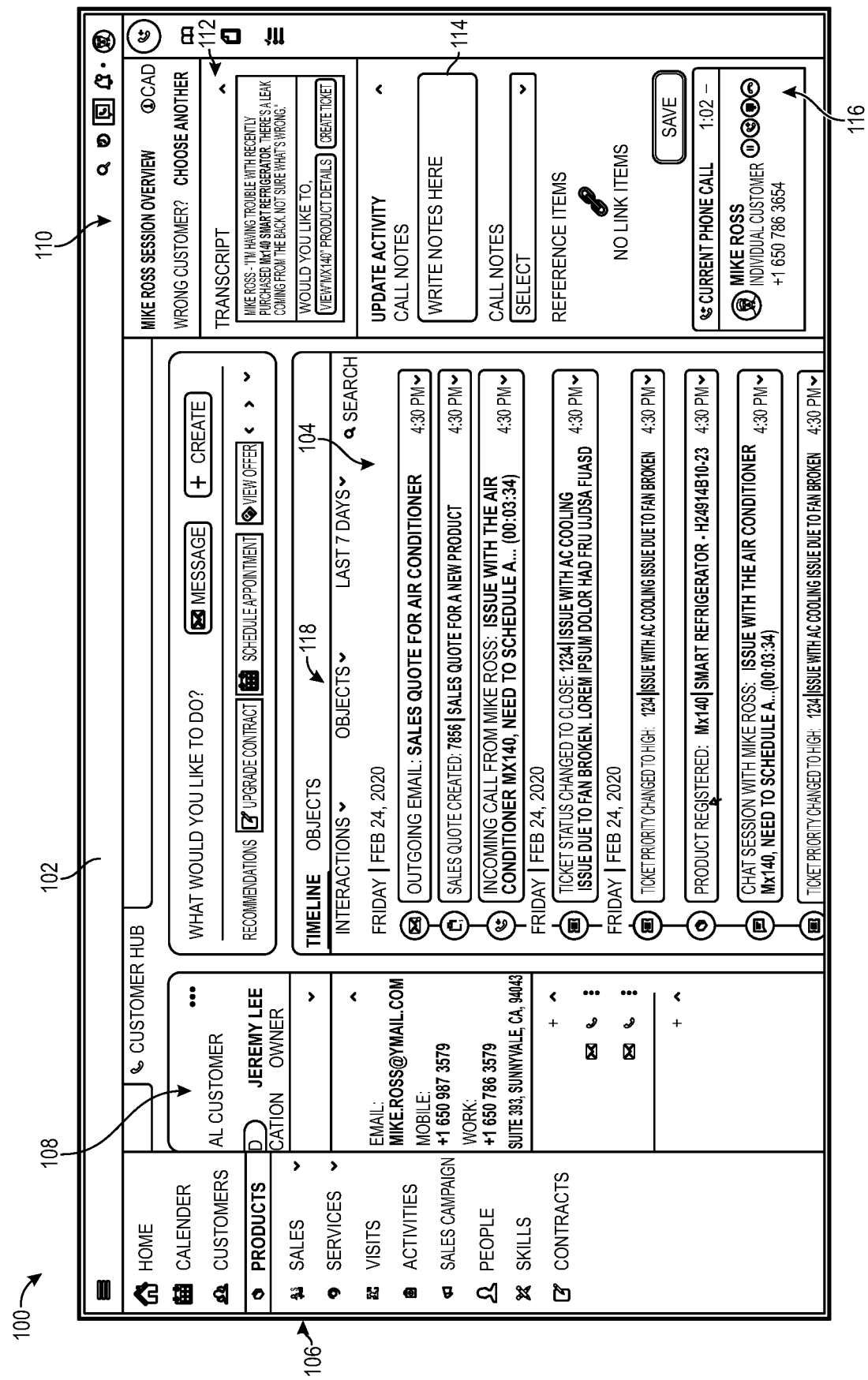
FIG. 1 depicts an exemplary embodiment of a graphical user interface displaying a timeline.

FIG. 1 depicts a computer display 100 displaying an exemplary graphical user interface (GUI) 102 comprising an exemplary timeline 104. In some embodiments, GUI 102 may be displayed to a user that may represent a company for assisting a customer of the company. The customer may contact the user by telephone, email, chat, direct message, or any communication method. The user may access an account of the customer or a page displaying information associated with the customer to retrieve a history of customer interactions with the user or company. The user may access the timeline by receiving information indicative of the customer by the communication method and inputting the information into GUI 102 to open the page associated with the user or product or service. In some embodiments, the user may input information or information indicative of the user such as, a phone number, an email address, a customer identification number, or any other identifier that may be recognized by the system and associated with the customer. In some embodiments, the customer identifier may be recognized, and the user may be provided the page associated with the customer automatically.

In some embodiments, GUI 102 comprises main menu 106. Main menu 106 may provide interaction elements indicative of time, customers, products, sales, and other various categories to display information associated with each category to aid in customer assistance. The user may access customer information 108 by the main menu 106. Furthermore, in some embodiments, the user may select timeline 104 by the main menu as well as customizable options to customize timeline 104 as described in embodiments herein.

As shown, customer information 108 associated with and indicative of the customer is displayed at the left-hand side of GUI 102. Customer information 108 may be displayed by a customer tab or a customer window that displays, in some embodiments, a name, an identification number, a telephone number, an email address, financial account information, and any other information associated with the customer. The contact methods such as, for example, email and telephone links may also be provided by GUI 102 such that the user may easily contact the customer.

In some embodiments, session overview page element 110 may be provided. Session overview page element 110 may provide information associated with a current communication with the customer. The current communication may provide transcript 112 comprising current communication as well as options for common selections to aid in assisting the customer. Call notes section 114 may provide on option for adding text for notes for future interactions and for record keeping may also be provided. In some embodiments, text may be provided for communication between the customer and the user though a chat window or direct message window field. Furthermore, current interaction element 116 may be displayed for presenting the current interaction information between the customer and the user. The user may interact with the current interaction element 116 for telephone calls, chats, text messages, direct messages, emails, and any other communication type. As such, the user may communicate continually with the customer during the interaction.

In some embodiments, timeline 104 may be embedded in GUI 102 at a central location as shown in FIG. 1. As such, GUI 102 may be customizable by any user and administrator. In some embodiments, the user or an administrator may embed timeline 104 at any location on GUI 102 and the various elements of GUI 102 may be displayed at various locations. Furthermore, timeline 104 may be embedded in a tab or a separate window may open providing the selected categorical data as described in embodiments below.

Figure 2:
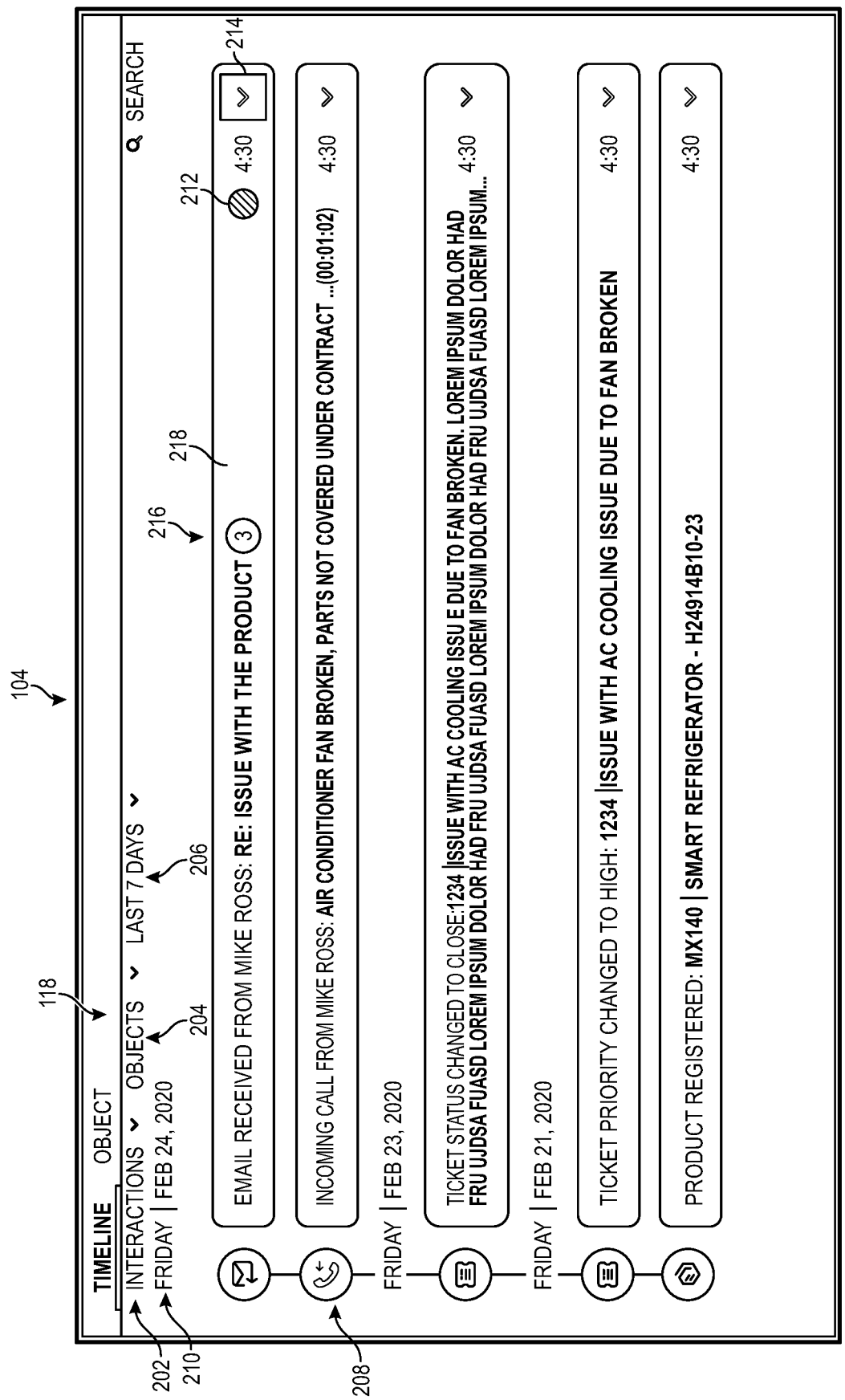
FIG. 2 depicts an exemplary timeline for embodiments of the present teachings.

Furthermore, in the embodiment depicted in FIG. 2, timeline 104 is displayed by GUI 102 at a central location, and timeline 104 may depict header menu 118, event cards 216, and event category icons 208. In some embodiments, header menu 118 may display three menu items (e.g., interaction menu item 202, object menu item 204, and time range menu item 206). Though three menu items may be displayed, any number of menu items with various categorical specificity may be displayed. In some embodiments, when an interaction or an interaction menu item is selected, only the interactions associated with the particular interaction category may be displayed. In some embodiments, when interaction menu item 202 is selected, only customer interactions may be displayed. For example, the user may select interaction menu item 202 and only telephone calls, text messages, chat interactions, emails, and the like may be displayed. The interactions may be displayed in chronological order such that the user may find particular interactions by scrolling to the date of the interaction as event dates 210 may be displayed on timeline 104.

In some embodiments, object menu item 204 may be selected. When object menu item 204 is selected, only objects associated with object data may be displayed. Object menu item 204 may be indicative of any general workflow data object such as, for example, a registered product, a maintenance issue, a workflow or repair ticket item, an account creation, and any other object. The object item may be displayed in a dropdown menu for further categorical filtering.

In some embodiments, time range menu item 206 may be selected. When time range menu item 206 is selected, options for time ranges may be provided for customizing timeline 104. In some embodiments, as depicted, timeline 104 may be automatically adjusted to display events over the last seven days. In some embodiments, the seven-day time range may be customizable by the user such that the user may input a time range of the last thirty days, one year, or between a start date and an end date. In some embodiments, any custom time range may be imagined for displaying events in timeline 104.

In some embodiments, the timeline may display events in chronological or reverse chronological order depending as displayed by event date 210 displayed on timeline 104. As described above, the events may be any of creating an account, purchasing a product or service, website click-throughs, orders, communications, workflow tickets, or any other event that may be relevant to assisting the customer. In some embodiments, the events displayed by timeline 104 may be displayed on event cards 216 as shown. Event cards 216 may be arranged according to settings customized by the user by accessing a settings menu item on main menu 106 or by selecting header menu 118 above the displayed event cards 216.

In some embodiments, timeline 104 may display entries and/or modifications by the user. The user may access timeline 104 directly, a data table, or a field for entering information into timeline 104 to be displayed by event cards 216. The user may add cards or edit event cards 216 to timeline 104. In some embodiments, the edits and additions may be stored in a data stored and displayed on timeline 104. The user may enter any modifications and add entries to timeline 104 such that the entries and modifications may be associated with a particular interaction, object, timeline, customer, event category, event, time, and any other association that may be useful. Furthermore, the data that the agent inputs may be bound to all relevant data associated with timeline 104. Consequently, when the agent submits a modification, any associated entries may also be updated with the modification. As such, any association between data objects may be related through relating object identifiers as well as through data binding. For example, continuing with the exemplary incorrect address embodiment described above, the user may update the customer's address to correct the address issue. The user may simply correct the address at event card 218. Because event card 218 data may be associated with the customer profile, the user may select an update all button or all instances of the customer address may be automatically updated. In some embodiments, the original record may be stored, or the user may not be permitted to make modification to the timeline thereby maintaining a record of the customer interactions.

In some embodiments, there may be several customizable ways to display events by receiving selections by the user. In some embodiments, the user may select card expansion button 214. Card expansion button 214 may expand event card 218 such that the contents of event card 218 may be displayed as depicted in FIG. 3 and described in detail below. Furthermore, in some embodiments, the user may select drill-down action icon 212 displayed on event card 218. Drill-down action icon 212 may be an interaction button where, upon selection of drill-down action icon 212, the event category associated with event card 218 may be displayed showing all events within the event category. FIG. 3 displays the outcome of selection of drill-down action icon 212 and card expansion button 214.

In some embodiments, the user may select any portion of event card 218 displaying the event. Event card 218 may be selected and events associated with timeline 104 may be filtered to only display event cards associated with the event category of the selected event card 218. As in the example described above, the user may select a telephone call card and all telephone calls associated with the customer may be displayed while filtering out all other event categories. In some embodiments, when the user selects event card 218, information associated with event card 218 may be displayed. The action taken after selection of event card 218 may be customizable by the user as described in embodiments below.

Turning to FIG. 3, timeline 104 may be displayed after event card 218 or drill-down action icon 212 been selected. Event card 218 may be indicative of an interaction, in the depicted scenario, the interaction being an email. Furthermore, event card 218 may be indicative of an event category and, as such, timeline 104 may continue to display event category icon 208 on the left side of timeline 104. Event category icon 208 may be selected to expand event card 218 directly adjacent to event category icon 208 and show the information indicative of the event. Furthermore, as shown, event category icon 208 may be displayed at the first event of the event category string. The event category may be displayed only at the first event and each subsequent event or the event category may be indicated by an exemplary circle 302 until all events within the event category have been displayed. When all of the events within the event category are displayed, a next event category may be displayed below the event category. As depicted in FIG. 3, the event category may be email and the next event category displayed may be telephone conversations.

As depicted in FIG. 3, the event category may be email. The user may select event card 218, or a button, such as drill-down action icon 212, associated with event card 218 from timeline 104 depicted in FIG. 2. Event card 218 may display information indicative of an email from the customer as depicted in FIG. 3. Consequently, timeline 104 may filter all non-email related events and only display a series of email event cards 306 that correspond to emails from the customer. As such, customer identifiers may be associated with the event identifiers for displaying the events relative to the customer. Each event (e.g., each email) corresponding to the event category (e.g., emails) associated with the customer may be displayed based on the selection by the user of event card 218. In some embodiments, all emails associated with the user may be displayed by a series of email event cards 306 in chronological order as depicted in FIG. 3. In some embodiments, email event cards 306 may be displayed in reverse chronological order and in any time range customized by the user.

In some embodiments, only recent emails may be displayed, and, in some embodiments, a time range may be defined and only emails that fall within the defined time range may be displayed. In some embodiments, the time range may be defined by the user selecting one of the timeline menu items in the header menu 118. Email event cards 306 may be displayed as specified by the user selections in the time range item as described in embodiments above.

In some embodiments, as depicted in FIG. 3, GUI 102 may display most recent email 304 and a history of email events in chronological order below most recent email 304, depicted as email event cards 306. In some embodiments, any one of email event cards 306 may be selected to view the content of each email associated with the email event card selected. Furthermore, time stamps as well as expansion button selections may be provided to expand the email event cards 306 to view the content associated with the email event cards 306. In some embodiments, all email event cards 306 may be expanded such that the user may view all content.

Though, embodiments described above relate to displaying events that may be customer based, in some embodiments, events may be displayed based on category alone. For example, the user may wish to see all recent emails, recent telephone calls, recent direct message, and the like rather than customer specific events. As such, the user may select all events and provide a time frame such as, for example, today, and view all event cards 216 for the day. In this way, the user may find a specific event card when a customer name or associated identifier is not known. The user may then select any specific event category such as for example, email, and display all emails that were sent and received for the day. Further, the user may then select a sent email card and view all sent emails for the day. Even further, the user may then select a card associated with an email that was sent to a specific customer and all cards associated with emails for the day that were sent to the customer may then be displayed. The process described here may be customized by the user in any way. As described above, narrowing the categories by simply selecting a card of a representative categories allows the user to narrow the information that may be displayed such that the user is not overwhelmed by the amount of information and can easily find past interactions within the specified category and sub-category.

For example, the user may be on a call with the customer. The customer may have ordered a product that has not yet been received and online tracking information states that the product was delivered. The user may select a product category and all texts, telephone calls, and all other events may be filtered out such that only information associated with the product history may be displayed. Events associated with the product history may be purchase information, product tracking information, and product delivery information. It may be discovered that the product was delivered to an incorrect address. The customer may indicate that a call was made to change the delivery address, but the customer does not know the exact date of the call. The user may then select drill-down action icon 212 from a card indicative of a telephone call with the customer and a chronological list of calls between an agent and the customer may be listed. As all other events and event categories are filtered out, it may be convenient for the user to find the particular call related to the change of address that the customer references.

In some embodiments, when an event category may be selected, event cards 216 may be displayed below the most recent card as described above. In some cases, as displayed in FIG. 3 there may be only a few email event cards 306. As such, a next category (e.g., telephone calls) may be automatically displayed below the email category. The next event category to be displayed may be customized by the user or may be selected automatically based on a history of interactions of the user, and a history of interactions of the customer.

In some embodiments, the agent may customize the timeline to display various event categories in combination. For example, if a customer doesn't know if it was chat or direct message, the user may filter bay chat and message such that a chronological list of both chat and message interactions may be displayed. As such, phone calls, emails, and any other interactions that are not chat and message-based interaction may be filtered out. As such, event cards 216 may be displayed for only the event categories selected by the user. In some embodiments, event cards 216 may be displayed in order with the event categories separate such that one event category may be displayed before the other as depicted in FIG. 3. In some embodiments, the event categories may be displayed together in chronological order. The presentation of the event categories may be customized by the user.

Though, in some embodiments, the customer is described as a person interacting with a user where the user is a representative of a company, in some embodiments, the customer may be another company or representative of another company. As such, any embodiments described herein may apply to a business-to-business relationship. In some embodiments, in a business-to-business scenario, events may occur on a steadier basis such as daily, hourly, or even by the minute. In such scenarios, it may be even more advantageous to provide drill-down visualization of events as described above. In a business-to-business scenario the number of events may be overwhelming to a user and may be constantly changing. Therefore, providing the systems and methods described herein, reduces the data to manageable size for users.

Figure 4:
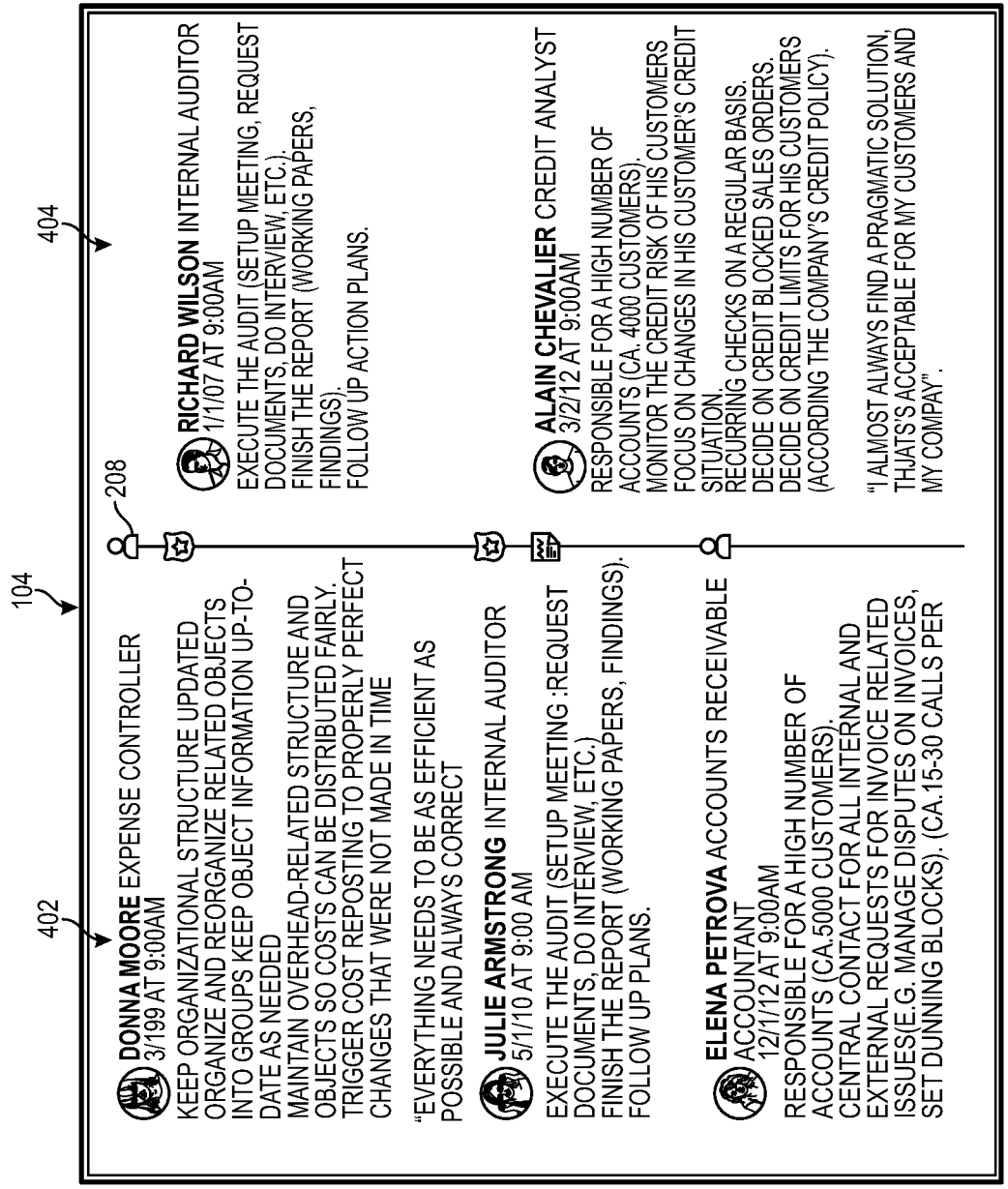
FIG. 4 depicts an exemplary split timeline for embodiments of the present teachings.

In some embodiments, GUI 102 as well as the timeline may be customized. FIG. 4 depicts timeline 104 in a side-by-side, or double-sided, arrangement such that the user and the customer communication can be viewed simultaneously on left side 402 and right side 404. As depicted, several people may be communicating simultaneously. As such, event category icon 208 may be indicative of a position or business, business section, or any other relation to the person or company that the person represents. In some embodiments, event category icon 208 may be indicative of the person such as, for example, a picture or other graphic feature that may be customizable by the person. Embodiments described herein may be applied to the double-sided timeline depicted in FIG. 4. For example, the user may select an event card of the left side 402. When selected left side 402 may display the drill-down of the event category of the event card selected. For example, in the scenario where several different customers are messaging, the event category may be a specific customer. The drill-down view may display event cards 216 indicative of all events associated with that particular customer. Furthermore, the user may then select an event card associated with the customer and the drill-down view of the selected event category may be displayed (e.g., emails associated with the specific customer).

FIG. 5 depicts a method of presenting drill-down access of timeline events to user generally reference by the numeral 500. At step 502, timeline 104 may be displayed to the user by GUI 102. GUI 102 may comprise information indicative the customer and a current line of communication as well as provide the user with actions to take as described in embodiments above. In some embodiments, timeline 104 may be displayed at any location of GUI 102 as customized by the user. In some embodiments, timeline 104 comprises menus for selection by the user as well as customized display options as described above. Furthermore, in some embodiments, timeline 104 comprises a chronological list of event cards 216 indicative of events relating to the customer and timing information for the events.

At step 504, the GUI 102 may receive a selection of an event category by the user. The user may select at least one of an event card, a menu item, or an event icon associated with the event card. The user may define settings as well as select a plurality of event categories by the menu items. As described above, the user may select a plurality of event categories to display. Furthermore, the user may select a time range and event categories and the displayed event cards 216 may be indicative of the customer and event category during the specified time range.

At step 506, upon selection of the event card in timeline 104, event cards 216 of the specific event category and associated with the customer may be displayed. The event categories may be any workflow objects, product and service histories and tracking, and customer interactions. Furthermore, the events displayed on the event cards 216 may be any profile creation, product orders, emails, telephone calls, messages, and timing of the events. In some embodiments, event cards 216 may be presented in chronological or reverse-chronological order or the event card order may be displayed in any way customizable by the user.

At step 508, the user may customize the display of the events. In some embodiments, the events may be displayed in chronological or reverse chronological order and by any time range defined by the user. In some embodiments, event categories may be defined as the order. For example, event cards 216 may be displayed based on emails from a company. The user may also define that emails from a specific customer within the company may be displayed before all emails from the company. Any object may be displayed in any order based on the object identifier in any order as defined by the user. As such, the user may have complete control over the drill-down display such that with a single click any order of event cards 216 representing any events may be displayed.

At step 510, the system may cause display of the selected event for the selected time frame. In some embodiments, data associated with events may be bound to other events. Furthermore, any data from events may be customized to be associated with other events. In some embodiments, event and customer identifiers may be arranged and connected through object identifiers such that event cards 216 associated with the events may be displayed when the user selects an event card. Consequently, events associated with the event category of the event card as well as any stored customization of the event may be applied to timeline 104.

At step 512, receive a selection of a particular event card from the plurality of event cards 216 displayed by timeline 104 corresponding to the selected event category. In some embodiments, after the user has selected an event card and a plurality of event cards associated with the event category of the selected event card may be displayed, the user may then select a second event card. Selection of the second event card may further narrow the event category or create a sub-category for display by timeline 104. For example, a plurality of customers may be in a chat. The user may select a particular event card indicative of one customer of the plurality of customers. Timeline 104 may then display event cards 216 indicative of all communications from the selected customer. To further reduce an amount of event cards 216, the user may then select a second event card corresponding to a particular type of communication such as, for example, telephone calls. Timeline 104 may then display event cards 216 indicative of telephone calls by the customer at step 514 and as described in steps 506 and 510 above. As such, any number of event cards 216 may be selected to reduce the number of displayed event cards 216 on timeline 104.

Turning first to FIG. 6, an exemplary hardware platform that can form one element of certain embodiments is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although embodiments of the invention have been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A computerized method of providing drill-down access to event categories on a user interface, the method comprising the steps of:
displaying, by the user interface, a timeline to a user,
wherein the displaying of the timeline comprises
displaying a first plurality of event cards associated with a customer and a second plurality of corresponding menu items, wherein each particular event card of the first plurality of event cards is indicative of a particular event of a plurality of events and a corresponding menu item of the second plurality of corresponding menu items is associated with a particular event category of a plurality of event categories;
receiving, by the user interface and from the user, a selection of a first event card of the first plurality of event cards, the first event card being associated with a first event category; and
causing display of a second plurality of event cards, wherein the second plurality of event cards is indicative of the customer and the first event category.

2. The computerized method of claim 1, further comprising the step of filtering out all of the plurality of event categories except the event category such that only event cards comprising the event category and indicative of the customer are displayed.

3. The computerized method of claim 1, wherein the second plurality of event cards are displayed based on the selection, by the user, of at least one of an event selection button displayed on the event card or by selection of the event card.

4. The computerized method of claim 3, wherein the event category is at least one of an interaction type with a customer or an object associated with a product or service associated with the customer.

5. The computerized method of claim 1, further comprising the steps of:
receiving a selection of a time frame by the user; and
displaying a third plurality of event cards indicative of events that occurred during the time frame while filtering out an event that did not occur within the time frame.

6. The computerized method of claim 1, further comprising the step of, upon selection of the event card, expanding the event card to display an event associated with the event card.

7. The computerized method of claim 6,
wherein the event card is a first event card; and
further comprising the steps of:
receiving a selection of a second event card of the second plurality of event cards; and
displaying a third plurality of event cards indicative of the event category and a second event category selected by the user.

8. One or more non-transitory computer-readable media storing computer-executable instructions that, when executed by a processor, perform a computerized method of providing drill-down access to event categories on a user interface, the computerized method comprising the steps of:
displaying, by the user interface, timeline to a user,
wherein the displaying of the timeline comprises
displaying a first plurality of event cards associated with a customer and a second plurality of corresponding menu items, wherein each particular event card of the first plurality of event cards is indicative of a particular event of a plurality of events and a corresponding menu item of the second plurality of corresponding menu items is associated with a particular event category of a plurality of event categories;
receiving, by the user interface and from the user, a selection of a first event card of the first plurality of event cards, the first event card being associated with a first event category; and
causing display of a second plurality of event cards, wherein the second plurality of event cards is indicative of the customer and the first event category.

9. The media of claim 8, wherein the computer-executable instructions are further executed to perform the step of filtering out all of the plurality of event categories except the event category such that only event cards comprising the event category and indicative of the customer are displayed.

10. The media of claim 8, wherein the second plurality of event cards are displayed based on the selection, by the user, of at least one of an event selection button displayed on the event card or by selection of the event card.

11. The media of claim 8, wherein the event category is at least one of an interaction type with a customer or an object associated with a product or service associated with the customer.

12. The media of claim 8, wherein the computer-executable instructions are further executed to perform the steps of:
receiving a selection of a time frame by the user; and
displaying a third plurality of event cards indicative of events that occurred during the time frame while filtering out an event that did not occur within the time frame.

13. The media of claim 8, wherein the computer-executable instructions are further executed to perform the step of, upon selection of the event card, expanding the event card to display event associated with the event card.

14. The media of claim 8,
wherein the event card is a first event card; and
wherein the computer-executable instructions are further executed to perform the steps of:
receiving a selection of a second event card of the second plurality of event cards; and
displaying a third plurality of event cards indicative of the event category and a second event category selected by the user.

15. A system for providing drill-down access to event categories on a user interface, the system comprising:
a processor;
a display configured to present a user interface;
one or more non-transitory computer-readable media storing computer-executable instructions that, when executed by the processor, perform a computerized method of providing the drill-down access to the event categories on the user interface, the computerized method comprising the steps of:
displaying, by the user interface, timeline to a user, wherein the displaying of the timeline comprises
displaying a first plurality of event cards associated with a customer and a second plurality of corresponding menu items, wherein each particular event card of the first plurality of event cards is indicative of a particular event of a plurality of events and a corresponding menu item of the second plurality of corresponding menu items is associated with a particular event category of a plurality of event categories;
receiving, by the user interface and from the user, a selection of a first event card of the first plurality of event cards, the first event card being associated with a first event category; and
causing display of a second plurality of event cards, wherein the second plurality of event cards is indicative of the customer and the first event category.

16. The system of claim 15, wherein the computer-executable instructions are further executed to perform the step of filtering out all of the plurality of event categories except the event category such that only event cards comprising the event category and indicative of the customer are displayed.

17. The system of claim 15, wherein the event category is at least one of an interaction type with a customer or an object associated with a product or service associated with the customer.

18. The system of claim 15, wherein the computer-executable instructions are further executed to perform the steps of:
receiving a selection of a time frame by the user; and
displaying a third plurality of event cards indicative of events that occurred during the time frame while filtering out an event that did not occur within the time frame.

19. The system of claim 15, wherein the computer-executable instructions are further executed to perform the step of, upon selection of the event card, expanding the event card to display an event associated with the event card.

20. The system of claim 15,
wherein the event card is a first event card; and
wherein the computer-executable instructions are further executed to perform the steps of:
receiving a selection of a second event card of the second plurality of event cards; and
displaying a third plurality of event cards indicative of the event category and a second event category selected by the user.

* * * * *